United States Patent [19]

Peters

[11] Patent Number: 5,390,839
[45] Date of Patent: Feb. 21, 1995

[54] COMBINATION DECOY CARRIER AND DOG STAND

[76] Inventor: Francis Peters, 450 Clinton St., Carlyle, Ill. 62231

[21] Appl. No.: 72,411

[22] Filed: Jun. 7, 1993

[51] Int. Cl.$^6$ ............................................. A45F 4/02
[52] U.S. Cl. .................................. 224/153; 224/210; 224/261; 297/188
[58] Field of Search ............... 224/155, 153, 209, 210, 224/261; 297/188, 118, 217, 17; 34/DIG. 68

[56] References Cited

U.S. PATENT DOCUMENTS

| | | | |
|---|---|---|---|
| 1,615,159 | 1/1927 | Bönner | 224/155 |
| 3,266,686 | 8/1966 | Griffith | 224/155 |
| 3,315,856 | 4/1967 | Black | 224/155 |
| 4,148,376 | 4/1979 | Campbell, Jr. | |
| 4,387,924 | 6/1983 | Fernandez | 297/188 |
| 4,676,548 | 6/1987 | Bradburg | 224/155 X |
| 4,885,812 | 12/1989 | Lindner | 5/113 |
| 5,009,285 | 4/1991 | Ramsey | 182/187 |
| 5,016,732 | 5/1991 | Dunn | 182/116 |
| 5,016,792 | 5/1991 | Jay | 224/155 |
| 5,209,381 | 5/1993 | Jay | 224/155 |

FOREIGN PATENT DOCUMENTS

| | | | |
|---|---|---|---|
| 234981 | 5/1911 | Germany | 224/155 |
| 362400 | 10/1922 | Germany | 224/155 |
| 1194851 | 6/1970 | United Kingdom | 224/155 |

Primary Examiner—Ernest G. Cusick
Attorney, Agent, or Firm—Don W. Weber

[57] ABSTRACT

A lightweight combination duck decoy carrier and dog stand is presented. The dog stand is a rectangular platform made of tubular aluminum with plastic webbing across it. Unfolding from the horizontal frame are four legs also made of tubular aluminum. Each pair of legs has a cross support. Also attached to the frame is a lightweight duck decoy net and a shoulder harness. The device may conveniently carry decoys through the wilderness in its folded up position by means of the shoulder harness. Once at the hunting sight, the device is deployed by unfolding the legs and sticking the ends of the legs into the ground. The dog stand is then about three feet from the mud or water level.

4 Claims, 2 Drawing Sheets

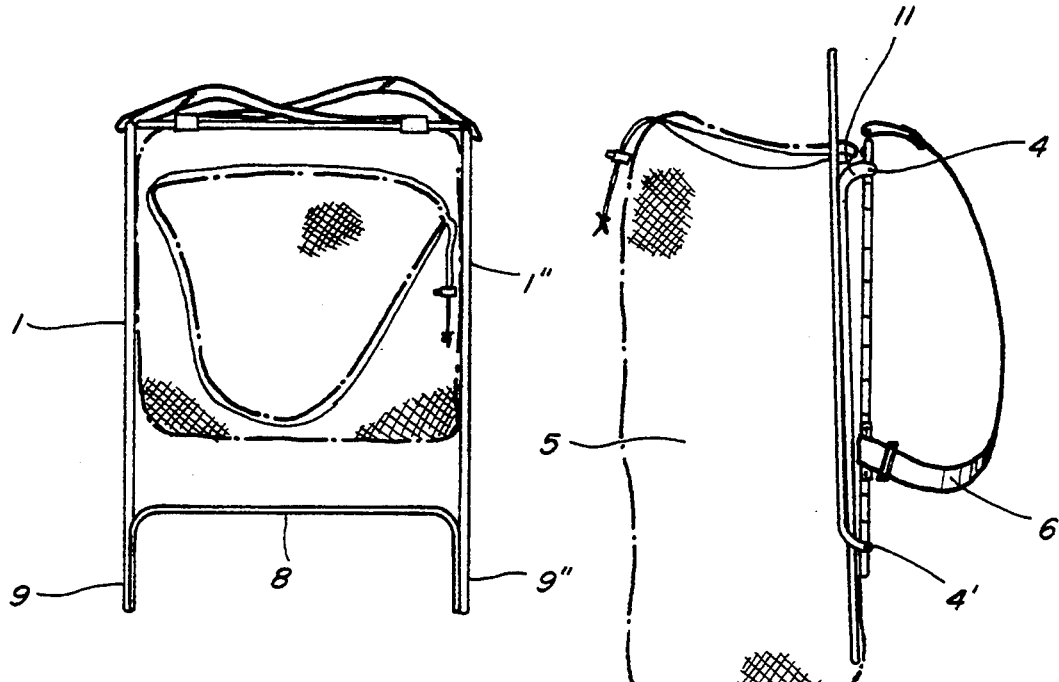
Fig. 4
Fig. 5
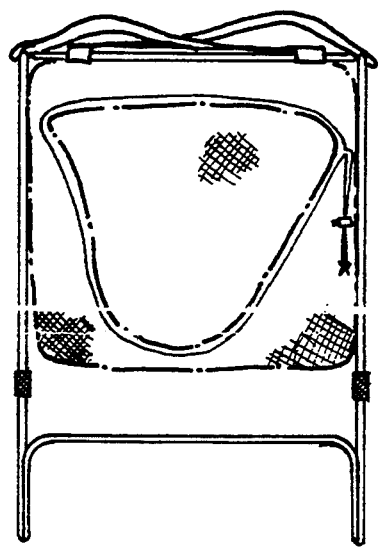
Fig. 6

COMBINATION DECOY CARRIER AND DOG STAND

BACKGROUND OF THE INVENTION

This invention relates to the field of outdoor recreational equipment, and more particularly to a combination decoy carrier and dog stand.

In the enjoyment of the outdoor sports, particularly duck hunting and similar endeavors, it is often necessary to bring the implements of the activity along with the hunter through various woods and marshy areas. In particular, when hunting ducks, it is necessary to bring along a number of lightweight but bulky duck decoys. These duck decoys are normally anywhere from 10 to 14 inches in length, 4 to 6 inches in width, and 6 to 10 inches in height. The decoys are shaped like a duck and intended to float.

Once the ducks have been shot, frequently over water, a dog is sent out into the water to retrieve the fallen ducks.

The hunter often has to wait for long periods of time before encountering any game. Frequently the environment of this waiting can occur in muddy, marshy or areas in which a few inches of water are present. While a hunter is frequently prepared for this environment, the dog often is not. Although hunting dogs are sturdy animals, it would be advantageous for the dog to have a dry place in which to await the game.

It is an object of this invention to provide a lightweight backpack type apparatus which is capable of holding a number of duck decoys on the back of the hunter as he traverses the wilderness. It is a further object of this invention to provide such a decoy backpack which is easily convertible into a flat dog stand for holding the dog above the water. It is a still further object of this invention to provide such an apparatus in combination, which is not only lightweight but also serves the dual function above described.

Further objects of this invention will become apparent upon reading the following Specification.

BRIEF DESCRIPTION OF THE INVENTION

This invention is made up of a lightweight, tubular, essentially rectangular frame having a waterproof type of webbing across the rectangular frame. Attached to the frame are left and right essentially U-shaped folding legs. These legs fold against the frame when carrying the apparatus but fold down to form vertical perpendicular support legs when the apparatus is used as a dog stand. Also attached to the frame is a large but lightweight net capable of carrying a number of duck decoys. The apparatus is carried by means of a shoulder harness attached to the essentially rectangular frame.

The hunter may haul duck decoys through the wilderness utilizing the net attached to the frame. Once in position, the frame may be unfolded and placed into the ground, leaving the webbed platform above the ground and any surface mud or water for the hunting dog.

BRIEF DESCRIPTION OF THE DRAWINGS

FIGS. 4 and 6 are end views of the device in its deployed position.

FIG. 5 is a side view of the device shown in FIG. 1.

DETAILED DESCRIPTION OF THE PREFERRED EMBODIMENT

A lightweight versatile dual function hunting apparatus is presented which enables the hunter to carry decoys to a remote location and then to deploy the apparatus to keep the hunting dog dry.

Figure 3:
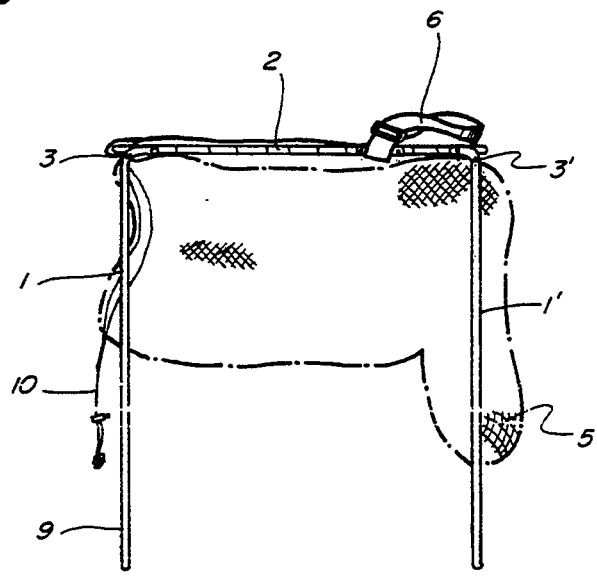
FIG. 3 is a side view of the device with its legs extended showing the general configuration of the horizontal platform and vertical legs.

The device comprises a pair of left 1 and right 1' legs pivotally attached to a horizontal frame 2. When in the deployed position, as shown in FIGS. 3 and 4, the device has an essentially horizontal frame platform and four vertical legs. The front left leg 1 is connected to the back left leg 1" by the cross support 8. The front right leg 1' is also connected to a back right leg (not shown) by cross support 8.

The legs are straight in their length but have curved portions 3 and 3' where the legs 1 and 1' attach to the horizontal rectangular frame 2. These curved portions pivot about leg pivot points 4 and 4'. In the collapsed configuration, the legs are essentially parallel to the horizontal frame, having pivoted about pivot points 4 and 4', as best shown on FIG. 1, 2, and 5.

Figure 1:
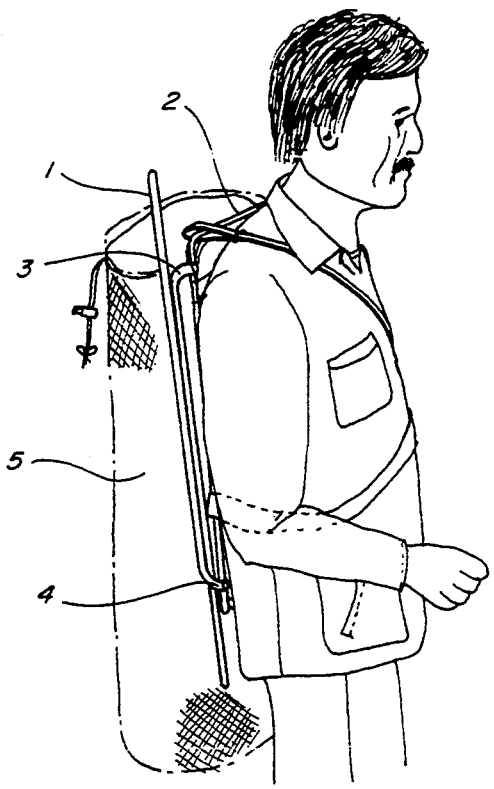
FIG. 1 is a perspective view of the device shown in its folded up position and carried by a hunter.

Also attached to the dog stand is a duck decoy net 5, as shown best on FIGS. 1 and 5. This duck decoy net 5 is made of lightweight netting capable of carrying a number of large duck decoys as currently used in the hunting art. Duck decoy net 5 is open at the top but is securely fastened by means of the net closure 10.

Figure 2:
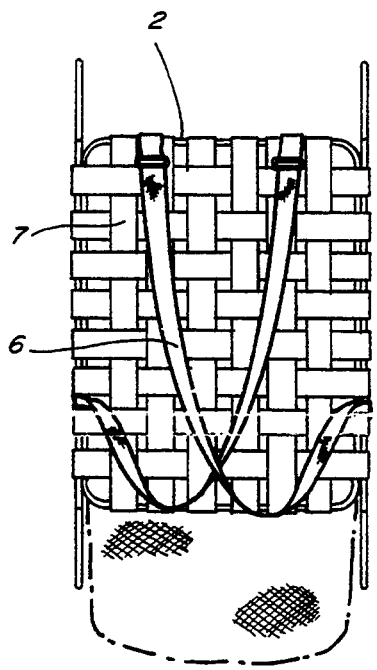
FIG. 2 is a top view of the device in its folded up position, showing the webbed platform.

Also attached to the combination net and stand device is a shoulder harness arrangement as shown on FIGS. 1, 2 and 5. This shoulder harness 6 comprises two straps, as shown on FIG. 2. These straps are meant to be worn across each of the hunter's shoulders in order for the hunter to carry the combination device through the woods.

As best shown on FIG. 2, the horizontal rectangular frame 2 of the combination device as an essentially horizontal platform formed by the platform webbing 7. This platform webbing 7 may be made of the standard type of wide plastic strips interwoven and fastened to the tubular horizontal rectangular frame 2, as best shown on FIG. 2.

Each pair of left and right vertical legs is connected and strengthened by a leg cross support 8, as shown on FIG. 4. This leg cross support 8 is placed across the front and back vertical legs 1 and 1" near the lower end 9 and 9' of the vertical legs. In the preferred embodiment, this leg cross support 8 is approximately 8" from the lower end of the deployed vertical legs as shown in FIG. 4.

The combination duck decoy carrier and dog stand is conveniently carried by the hunter as shown in FIG. 1. Once at the hunting site the combination decoy carrier and dog stand is deployed. After removing the duck decoys from the duck decoy net 5, the vertical legs are folded perpendicularly to the horizontal rectangular frame 2 as shown in FIG. 3. The lower end 9 of the vertical U-shaped legs are then placed into the ground by pushing on the leg cross support 8 by the foot. Once in the deployed position, the decoy carrier is converted into a dog stand having a horizontal rectangular frame 2. The legs are approximately four feet tall while the horizontal rectangular frame is approximately four feet square. The entire device weighs less than three pounds since the rectangular frame and legs are made of lightweight hollow aluminum tubing. The duck decoy net 5 is similarly made of lightweight material.

The vertical legs are normally a single length of tubing and are continuous. However, one variation of the instant invention would involve having telescoping vertical legs as shown in FIG. 6 which could then be adjusted to the varying heights required of the terrain. The telescoping nature of the legs, as described herein and shown on FIG. 6, is well known in the art. The vertical legs which pivot about pivot points 4 are designed with stops located on the curved portions 3 and 3' of the vertical legs so that the vertical legs and horizontal frame form an essentially rectangular cross section when deployed as shown in FIG. 3.

In actual practice, the dog stand is readily employed in mud or shallow water by placing the lower ends 9 of the vertical legs into the dirt or mud. Customarily, the lower ends 9 of the vertical legs are sunken into the ground to the level of the leg cross supports 8. It has been found that deploying the dog stand in this manner provides a stable yet dry horizontal platform for the dog and hunter to await the prey. While the platform webbing 7 is normally made of lightweight plastic, such as that found in the common lawn chair, it could also be made of canvas, polyester material or other lightweight material. While the horizontal frame 2 and vertical legs are normally made of lightweight tubular aluminum they could easily be made of any other type of material while still keeping within the contemplation and spirit of this invention.

Having fully described my device, I claim:

1. A combination duck decoy carrier and horizontal dog stand device, comprising:
    (a) an essentially rectangular frame having a top edge, a bottom edge, and two sides said frame having interwoven webbing attached to the inner area of said frame forming a platform;
    (b) four essentially straight legs, each leg having an upper curved end, said upper curved end pivotably attached to said rectangular frame and having a stop, wherein a pair of said legs are pivotably attached near the top edge of said frame, one on each side, and a pair of said legs are pivotably attached near the bottom edge of said frame, one on each side;
    (c) two inverted U-shaped cross-supports for said legs, one of said supports attached between each pair of legs, said cross-supports attached near the lower end of said legs;
    (d) a duck decoy net capable of carrying a number of large duck decoys attached to said frame; and
    (e) a shoulder harness attached to said frame for carrying said device;
    whereby, when said legs are pivoted so that they are parallel to said frame one can carry said device using said harness; and
    whereby, when said legs are perpendicular to said frame a horizontal dog stand is deployed; and
    whereby said cross-supports allow a lower portion of each of said legs to be pushed into the ground to the level of said cross-supports.

2. A combination duck decoy carrier and horizontal dog stand device as in claim 1, wherein said cross-supports are from 4 inches to 12 inches from the bottom of each vertical leg.

3. A combination duck decoy carrier and horizontal dog stand device as in claim 2, wherein said cross-supports are 8 inches from the bottom of each vertical leg.

4. A combination duck decoy carrier and horizontal dog stand device as in claim 1, wherein said legs comprise a telescoping shaft which allows the length of said legs to be adjusted;
    whereby varying heights of terrain could be accommodated by said device.

* * * * *